US009959504B2

(12) United States Patent
Gordon et al.

(10) Patent No.: US 9,959,504 B2
(45) Date of Patent: May 1, 2018

(54) SIGNIFICANCE OF RELATIONSHIPS DISCOVERED IN A CORPUS

(71) Applicant: International Business Machines Corporation, Armonk, NY (US)

(72) Inventors: John B. Gordon, Austin, TX (US); John P. Hogan, Hurley, NY (US); Sanjay F. Kottaram, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days. days.

(21) Appl. No.: 14/956,513

(22) Filed: Dec. 2, 2015

(65) Prior Publication Data

US 2017/0161615 A1  Jun. 8, 2017

(51) Int. Cl.
| | |
|---|---|
| G06F 17/00 | (2006.01) |
| G06F 17/20 | (2006.01) |
| G06N 5/04 | (2006.01) |
| G06N 99/00 | (2010.01) |
| G06F 17/28 | (2006.01) |
| G06N 3/02 | (2006.01) |
| G06F 9/44 | (2018.01) |
| G09B 7/04 | (2006.01) |
| G06N 5/02 | (2006.01) |

(52) U.S. Cl.
CPC ............. *G06N 5/04* (2013.01); *G06F 17/28* (2013.01); *G06N 3/02* (2013.01); *G06N 5/022* (2013.01); *G06N 99/005* (2013.01); *G06F 9/4446* (2013.01); *G06N 5/02* (2013.01); *G09B 7/04* (2013.01)

(58) Field of Classification Search
None
See application file for complete search history.

(56) References Cited

U.S. PATENT DOCUMENTS

| | | | |
|---|---|---|---|
| 6,539,376 B1 | 3/2003 | Sundaresan et al. | |
| 6,985,852 B2 * | 1/2006 | Wang | G06F 17/2785 704/9 |
| 7,523,128 B1 | 4/2009 | Miller et al. | |
| 8,005,724 B2 | 8/2011 | Dunning et al. | |
| 8,065,253 B2 | 11/2011 | Simmons et al. | |
| 8,108,417 B2 | 1/2012 | Franks et al. | |
| 8,346,701 B2 | 1/2013 | Wang et al. | |
| 8,631,048 B1 | 1/2014 | Davis et al. | |

(Continued)

FOREIGN PATENT DOCUMENTS

WO   2013127951 A1   9/2013

OTHER PUBLICATIONS

Chen et al.; "Focus, Newness and Their Combination: Processing of Information Structure in Discourse"; Aug. 2012; pp. 1-9; vol. 7; Issue 8; e42533; PLOS One.

(Continued)

*Primary Examiner* — Luis Sitiriche
*Assistant Examiner* — Ababacar Seck
(74) *Attorney, Agent, or Firm* — Stephen R. Yoder

(57) ABSTRACT

Certain relationships representing material insights are identified from among a set of discovered relationships. Cognitive discovery of relationships in a knowledge base, or corpus, are ranked according to one or more metrics indicative of material insights, including recentness and degree of alignment.

19 Claims, 5 Drawing Sheets

(56) References Cited

U.S. PATENT DOCUMENTS

| | | | |
|---|---|---|---|
| 8,660,977 | B2 | 2/2014 | Bechtel et al. |
| 8,793,312 | B2 | 7/2014 | Tao et al. |
| 2003/0182310 | A1* | 9/2003 | Charnock ......... G06F 17/30716 |
| 2004/0093331 | A1* | 5/2004 | Garner ................... G06N 5/022 |
| 2006/0212931 | A1* | 9/2006 | Shull ...................... G06F 21/55 726/10 |
| 2008/0319731 | A1 | 12/2008 | Chambliss et al. |
| 2009/0319296 | A1 | 12/2009 | Schoenberg |
| 2010/0191686 | A1* | 7/2010 | Wang ................ G06F 17/30634 706/46 |
| 2010/0235164 | A1* | 9/2010 | Todhunter ............. G06F 17/279 704/9 |
| 2010/0235361 | A1 | 9/2010 | Chandran et al. |
| 2013/0007020 | A1 | 1/2013 | Basu et al. |
| 2013/0317937 | A1* | 11/2013 | Dunning ........... G06F 17/30017 705/26.7 |
| 2014/0025687 | A1* | 1/2014 | Aleksovski ....... G06F 17/30994 707/748 |
| 2014/0082003 | A1* | 3/2014 | Feldman ........... G06F 17/30684 707/755 |
| 2014/0317103 | A1 | 10/2014 | Mukerjee et al. |
| 2015/0112664 | A1 | 4/2015 | Srinivasan |
| 2016/0110501 | A1 | 4/2016 | Allen et al. |
| 2017/0024310 | A1 | 1/2017 | Andrejko et al. |
| 2017/0076206 | A1 | 3/2017 | Lastras-Montano et al. |

OTHER PUBLICATIONS

Mojzis et al.; "Graph relationship discovery using Pregel computing model"; IEEE 13th International Symposium on Applied Machine Intelligence and Informatics; Jan. 22-24, 2015; pp. 203-206; Herl'any, Slovakia.

"Hierarchical Display of Group Discovery Relationships in a Relational Database System"; An IP.com Prior Art Database Technical Disclosure; IP.com No. 000203884; Feb. 8, 2011; pp. 1-6.

U.S. Appl. No. 15/163,741, Entitled "Significance of Relationships Discovered in a Corpus", filed May 25, 2016.

Appendix P.: List of IBM Patents or Patent Applications Treated as Related, Dated May 25, 2016, 2 pages.

Appendix P List of IBM Patents or Applications Treated as Related. Dated Dec. 7, 2017. Two pages.

Original U.S. Appl. No. 15/727,693, filed Oct. 9, 2017.

\* cited by examiner

US 9,959,504 B2

SIGNIFICANCE OF RELATIONSHIPS DISCOVERED IN A CORPUS

BACKGROUND

The present invention relates generally to the field of cognitive computing, and more particularly to knowledge base development.

Cognitive computing is a field of artificial intelligence which generally attempts to reproduce the behavior of the human brain. Cognitive computing refers to computing methods that are neither linear nor deterministic, but rather learn and interact with people in order to extend natural human function. Cognitive systems can perform a wide variety of tasks utilizing known artificial intelligence-based concepts such as natural language processing, information retrieval, knowledge representation, automated reasoning, and machine learning.

Cognitive computing systems often discover numerous relationships from analysis of a body of knowledge, knowledge base, or corpus. Cognitive systems are also good at highlighting the strongest relationships, such as relationships to Ford Motor Company include: (i) Henry Ford, and (ii) Model T. (Note: the term(s) "Ford Motor Company" and/or "Model T" may be subject to trademark rights in various jurisdictions throughout the world and are used here only in reference to the products or services properly denominated by the marks to the extent that such trademark rights may exist.)

Natural language processing (NLP) is a field of computer science, artificial intelligence, and linguistics concerned with the interactions between computers and human (natural) languages. Generally speaking, NLP systems use machine learning to analyze and derive meaning from textual corpora (that is, sets of textual content). Many known NLP systems annotate textual corpora (also referred to simply as "corpora," or, in the singular, a "corpus") with information that may be helpful in understanding and/or interpreting the text. For a Definition of "annotate," see the Definitions sub-section of the Detailed Description section.

SUMMARY

A method, computer program product, and computer system includes receiving a natural language question, parsing the natural language question to identify a focus, identifying within a document for a domain of knowledge a set of entities and a corresponding set of relationships among two or more entities of the set of entities, and ranking a first relationship with respect to a second relationship in the set of relationships according to an importance criteria.

DETAILED DESCRIPTION

Figure 1:
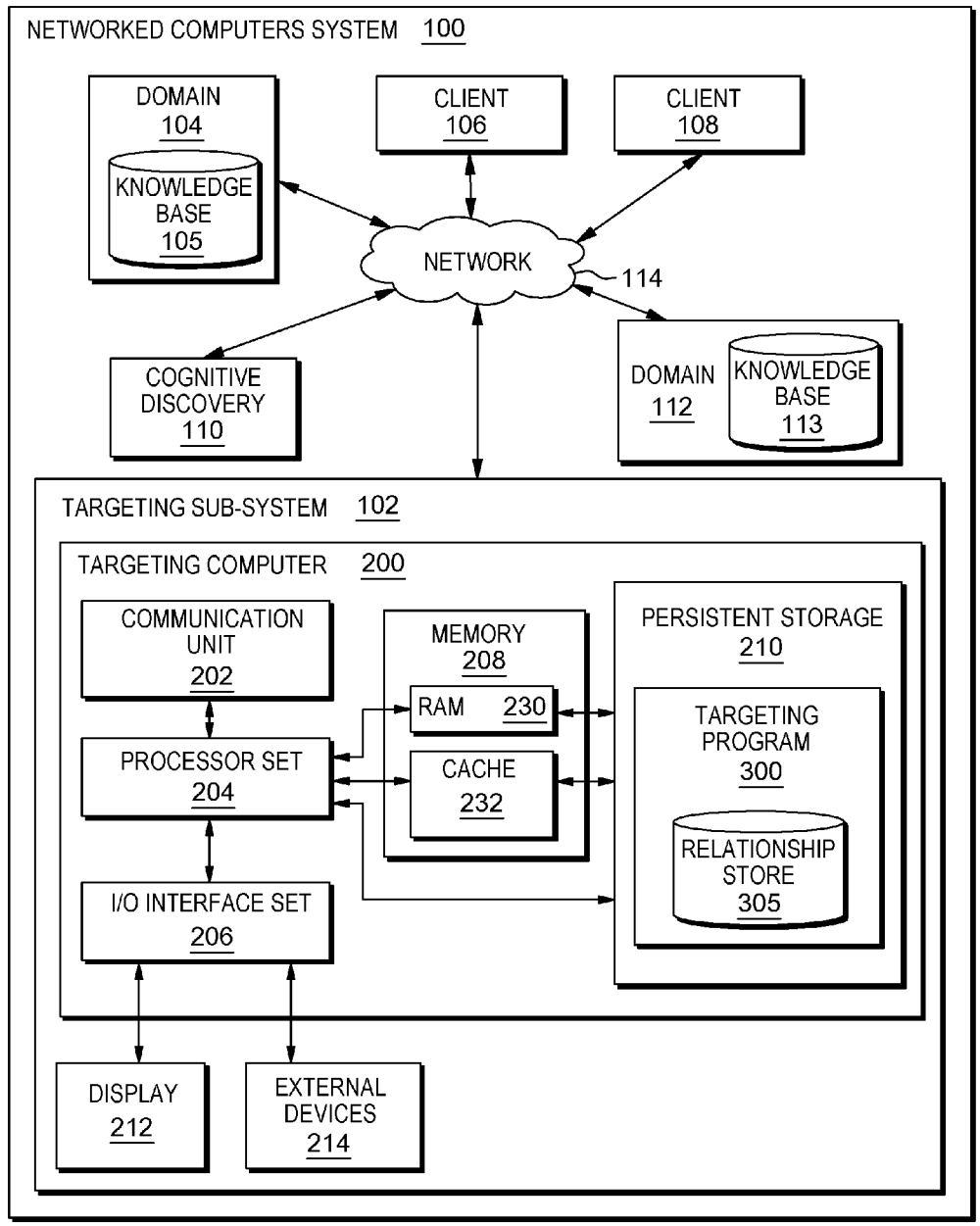
FIG. 1 is a schematic view of a first embodiment of a system according to the present invention.

Certain relationships representing material insights are identified from among a set of discovered relationships. Cognitive discovery of relationships in a knowledge base, or corpus, are ranked according to one or more metrics indicative of material insights, including recentness and degree of alignment. The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium, or to an external computer or external storage device via a network, for example, the Internet, a local area network, a wide area network, and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network, and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture, including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions, or acts, or carry out combinations of special purpose hardware and computer instructions.

The present invention will now be described in detail with reference to the Figures. FIG. 1 is a functional block diagram illustrating various portions of networked computers system 100, in accordance with one embodiment of the present invention, including: targeting sub-system 102; client sub-systems 106, 108; domain sub-systems 104, 112; knowledge bases 105, 113; cognitive discovery sub-system 110; communication network 114; targeting computer 200; communication unit 202; processor set 204; input/output (I/O) interface set 206; memory device 208; persistent storage device 210; display device 212; external device set 214; random access memory (RAM) devices 230; cache memory device 232; targeting program 300; and relationship store 305.

Sub-system 102 is, in many respects, representative of the various computer sub-system(s) in the present invention. Accordingly, several portions of sub-system 102 will now be discussed in the following paragraphs.

Sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine readable instructions and/or data that is used to create, manage, and control certain software functions that will be discussed in detail below.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware component within a system. For example, the communications fabric can be implemented, at least in part, with one or more buses.

Memory 208 and persistent storage 210 are computer readable storage media. In general, memory 208 can include any suitable volatile or non-volatile computer readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions, and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer readable storage medium that is also part of persistent storage 210.

Communications unit 202, in these examples, provides for communications with other data processing systems or devices external to sub-system 102. In these examples, communications unit 202 includes one or more network interface cards. Communications unit 202 may provide communications through the use of either, or both, physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with computer 200. For example, I/O interface set 206 provides a connection to external device set 214. External device set 214 will typically include devices such as a keyboard, keypad, a touch screen, and/or some other suitable input device. External device set 214 can also include portable computer readable storage media such as, for example, thumb drives, portable optical or magnetic disks, and memory cards. Software and data used to practice embodiments of the present invention, for example, program 300, can be stored on such portable computer readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the present invention. However, it should be appreciated that any particular program nomenclature herein is used merely for convenience, and thus the present invention should not be limited to use solely in any specific application identified and/or implied by such nomenclature.

Targeting program 300 operates to identify important relationship discoveries according to a pre-defined metric for comparing discovered relationships in a knowledge base. The comparison of relationships supports a ranking process, the highly ranked, or top-ranked, relationships being the ones that are most likely to bring new insights to the field of study represented by the knowledge base.

Some embodiments of the present invention recognize the following facts, potential problems and/or potential areas for improvement with respect to the current state of the art: (i) while relationships identified, or "discovered," by cognitive systems are often accurate, the relationships may reflect common knowledge rather than a material insight into a field; (ii) current cognitive computing systems are able to uncover hidden relationships, but depend on human analysts to determine the significance of the discovered relationships; and/or (iii) cognitive computing systems often uncover numerous relationships in a given knowledge base.

Some embodiments of the present invention are directed to a method for identifying material insights in the set of automatically discovered relationships by a cognitive system. Some embodiments of the present invention are directed to calculating a "degree of alignment" based on the amount of evidence there is to identify the relationship. Alternatively, the number of evidentiary documents that are the basis for identifying the relationship are considered for calculating the degree of alignment.

Considering the degree of alignment, the cognitive system can then be "controlled" to show discovered relationships corresponding to either more or less evidence depending on user preference. Where less evidence is the basis of a discovered relationship, less obvious material insights are identified from among the more obvious insights that may be discovered (with more certainty).

Some embodiments of the present invention track the degree of alignment for discovered relationships over time according to the latest state of the cognitive system as the knowledge base develops.

Some embodiments of the present invention are directed to an algorithm to determine the materiality of relationships identified by cognitive discovery solutions. The materiality being, in some embodiments, described by the "degree of alignment" with the evidence. Having determined the materiality, the output of the cognitive system is processed and prioritized according to a ranking of materiality. Further, in some embodiments, the results are presented to a user in a UI (user interface) showing the decisions and/or evidence that supports the materiality ranking.

Figure 2:
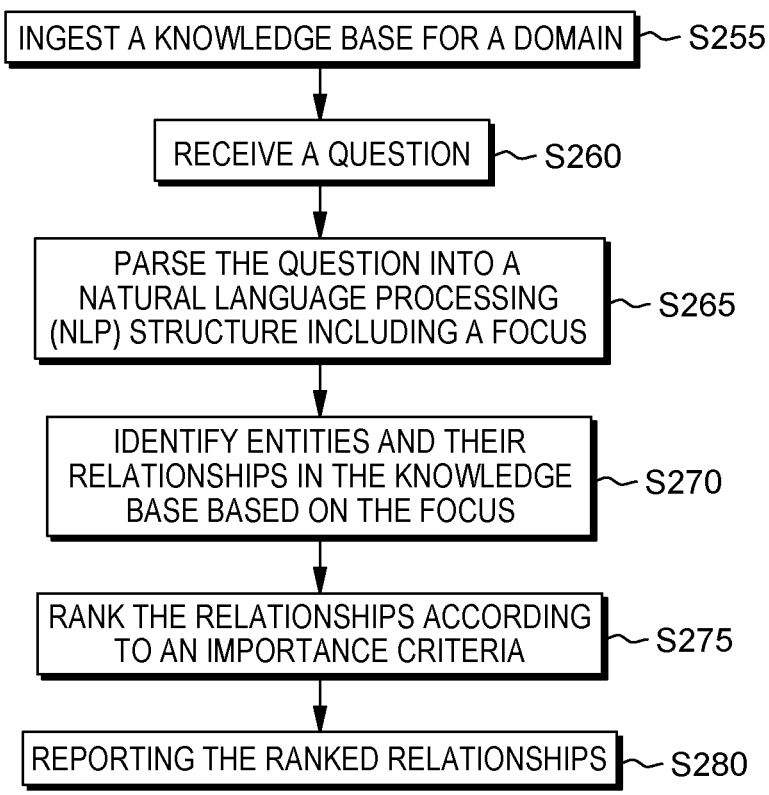
FIG. 2 is a flowchart showing a first embodiment of a method performed, at least in part, by the first embodiment system.
Figure 3:
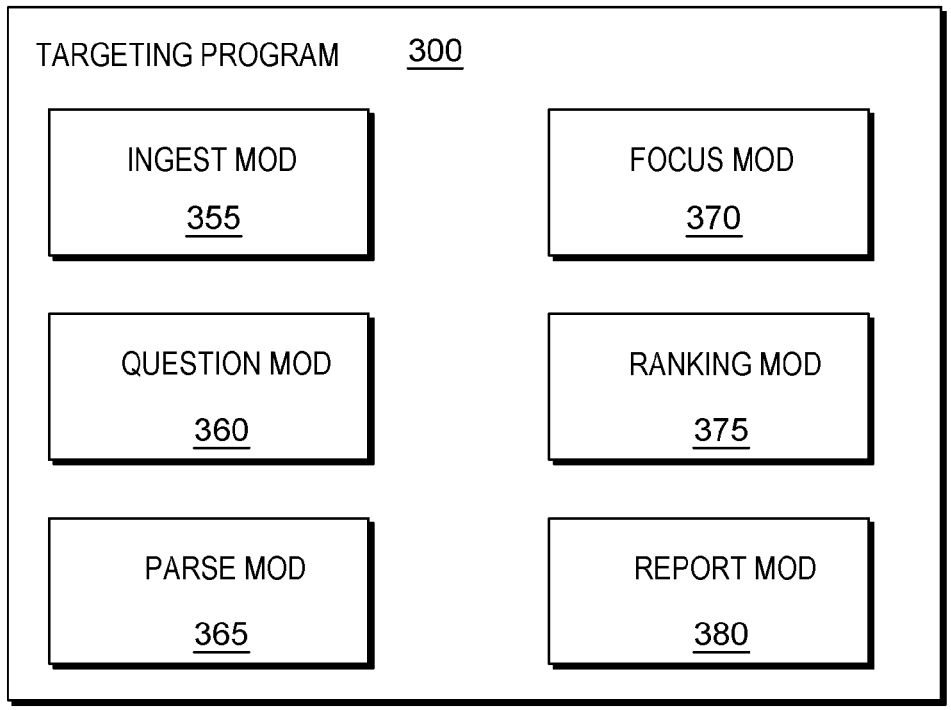
FIG. 3 is a schematic view of a machine logic (for example, software) portion of the first embodiment system.
Figure 4:
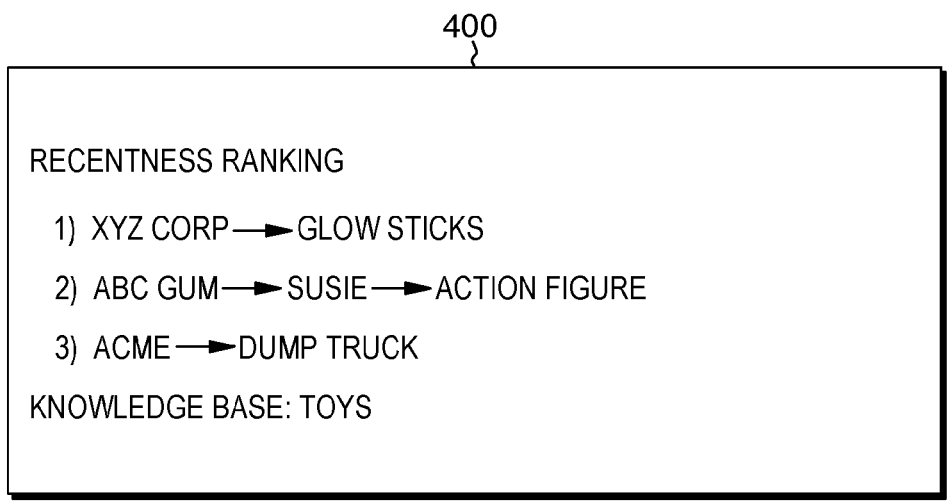
FIG. 4 is a screenshot view generated by the first embodiment system.

FIG. 2 shows flowchart 250 depicting a first method according to the present invention. FIG. 3 shows program 300 for performing at least some of the method steps of flowchart 250. This method and associated software will now be discussed, over the course of the following paragraphs, with extensive reference to FIG. 2 (for the method step blocks) and FIG. 3 (for the software blocks). FIG. 4 depicts an example screenshot displayed during operation of an embodiment of the present invention.

Processing begins at step S255, where ingest module ("mod") 355 ingests a knowledge base, or corpus, or a particular domain of knowledge or technical field. In this example, the ingest module ingests knowledge base 105 (FIG. 1), which includes data regarding the domain of toys. Alternatively, the ingest module ingests multiple knowledge bases, such as both knowledge bases 105 and 113.

Processing proceeds to step S260, where question mod 360 receives a question. In this example, the question mod receives a question from a user via a user interface (UI) displayed on display device 212 (FIG. 1). The user input "who makes the top selling toys" as the question. Alternatively, the question is generated as a set of training questions and input for receipt by the question mod according to a manner now known, or to be known in the future.

Processing proceeds to step S265, where parse mod 365 parses the question received at step S260 into a natural language processing (NLP) structure including a focus. The focus is, in some embodiments, the primary search query developed from the question received. Based on the above stated question, the focus is determined to be "Toys." Additionally, the NLP structure oftentimes includes a lexical answer type (LAT). An LAT is a word or noun phrase in the received question that indicates the type of answer without requiring any semantic analysis. If the LAT were applied in this question, the type of answer is "who makes X." While cognitive computing systems may provide additional NLP structure, such as the LAT, having a capability of parsing a natural language question to identify a focus of the question is sufficient for practicing various embodiments of the present invention.

Processing proceeds to step S270, where focus mod 370 identifies entities, or objects, in the knowledge base and their corresponding relationships based on the focus derived from parsing the question. In this example, the relationship between manufactured toy products and the manufacturer are identified based on the focus of the question received in step S260.

Processing proceeds to step S275, where ranking mod 375 ranks the identified relationships according to an importance criteria. Because the question did not recite a year in which the top selling toys were to be identified, the importance criteria is "recentness." Accordingly, the ranking mod operates to determine a most recent indication of a top selling toy and corresponding manufacturer. As discussed in more detail below, one or more of various tests are applied to the identified relationships including: (i) temporal test; (ii) evidence in domain test; (iii) evidence outside of domain test; (iv) age test; (v) type of evidence test; (vi) user criteria test; and (vii) known relationship test.

Processing ends at step S280, where report mod 380 generates a report of the ranked relationships according to the importance criteria. In this example, a report is displayed via the UI to the user for processing. For example, the user may select a top 5 relationships for printing to hard copy. Alternatively, the report is distributed to a pre-defined set of email addresses, or other contact information. Alternatively, the user is provided with input options to refine the original question.

While processing ends in this discussion at step S280, processing may return to other steps, such as step S265, when the user is provided an option to restate the question in light of the reported data.

Further embodiments of the present invention are discussed in the paragraphs that follow and later with reference to FIGS. 5 and 6.

Some embodiments of the present invention apply an algorithm that uses the output of existing cognitive discovery solutions, such as Watson Discovery Advisor, to identify a superset of relationships. (Note: the term(s) "Watson" and/or "Discovery Advisor" may be subject to trademark rights in various jurisdictions throughout the world and are used here only in reference to the products or services properly denominated by the marks to the extent that such trademark rights may exist.) Using this output, the relationships are ranked in order of importance based on a variety of criteria discussed in more detail below. The ranking calculation is an average of the weight given to criterion in the set of criteria by the user and multiplied by a ranking factor that is normalized for each step of the algorithm. In some embodiments, for those results that fall below a threshold rank, the user has the option of eliminating them from the results set.

Some embodiments of the present invention rely on a cognitive discovery solution to identify relationships based on a query by the user. In this example, the relationships are output to a format, such as XML, which can be understood by the targeting program, such as targeting program 300 (FIG. 1). Further, in this example, the relationship information is parsed into an operational store. Once in the operational store, the algorithm is, in this example, triggered by a user request. Alternatively, the algorithm is triggered by a pre-defined schedule. Alternatively, the algorithm is triggered automatically when a new query is run.

Some embodiments of the present invention are directed to a system that draws from a historical view of discovered relationships to highlight only those relationships within a set of discovered relationships that are, for example, (i) new, (ii) recently changed, and/or (iii) recently being mentioned significantly more than others (suggesting new information). In that way, the output of the cognitive system is prioritized according to content recentness, or timeliness, with respect to the corpus of knowledge being studied.

Some embodiments of the present invention are directed to the study of the age of discovered relationships based on previous mentions. If a discovered relationship is brand new, it is flagged as such and its relevance ranking is increased accordingly. If a discovered relationship pre-exists, but has changed recently, the original relationship and the recent changes are recorded. In some embodiments, all discovered relationships within a given corpus are checked for "frequency of mentions" according to a timeline. The mention frequency data is matched against past mention frequency results to observe trends. If a mention-frequency trend is increasing, then the relationship is considered to be timely as to relevance and it is flagged for review, for example, the relationship is recorded as timely. Alternatively, the relationship is tagged with meta-data for later recovery and/or search.

Some embodiments of the present invention operate in the following way. When the algorithm is triggered, the user is prompted to provide weighting information for each algorithm sub-component (for example, a range from 0-6). The algorithm processes each step as an independent thread and performs the ranking calculation when the steps are complete. The results are then returned to the user in ranked order with evidence attached for the ranking.

An algorithm according to some embodiments of the present invention is described in the next few paragraphs. For each discovered relationship the follow tests are applied: (i) a test of the newness, or recentness, of the relationship (based on a semantic search of available bodies of knowledge, the relationship is determined to be new for the domain) (for example, Ford->Henry Ford->Model T may be a new relationship in a political science domain, but not for an automotive use case) (brand new relationships are ranked higher than older relationships); (ii) the number of mentions of the discovered relationship in the specific body of knowledge studied; (iii) the number of mentions of the discovered relationship in general body of knowledge such as Wikipedia; (iv) the type and/or provenance of evidence supporting the discovered relationship; (v) the age of the relationship (in general, a higher ranking will be granted to newer relationships according to a sliding time scale appropriate to the subject matter; (vi) appearance of the relationship in a dictionary of known or common knowledge; (vii) user-defined criteria, such as a concept, keyword, or phrase whose presence has the effect of increasing/decreasing the rank or removing the relationship from review; and/or (viii) output format.

Another algorithm, which focuses on the recentness of discovered relationships includes: (i) a test of the relationship for changes from the original, particularly recent changes from earlier related status(es) (for example, GM->Henry Ford->Model T is a discovered relationship that is changed with respect to the above-cited relationship); and/or (ii) a count of relationship mentions is determined from the studied knowledge corpus, the count is stored as an integer and compared to past mention counts to identify trends in relationship mentions.

Some embodiments of the present invention test newly discovered relationships to understand if the discovered relationship is accounted for as a "changed relationship" with respect to an "original," earlier recitation, of a relationship, or an entirely new relationship. The determination is, in some embodiments, performed by a secondary routine, which triggers a cognitive discovery of the relationship of new and original concept. If there is a relationship showing a transition over time between a "new" and a corresponding original concept, then there is an assumption that a material change has occurred. This "new" concept may appear to be a semantic variant, which is also material. For example, Ford Motor Company-->Henry Ford-->Model T is a semantic variant to Ford->Henry Ford->Model T. Both situations may be flagged in the UI as being material.

In some embodiments of the present invention, mention trend changes, particularly increases, are recorded as material. For example, Ford->Henry Ford->Model T registered 140 mention as of yesterday, but today Ford->Henry Ford->Model T registered 10,000 mentions. This change is flagged as likely being a material relationship according to recentness considerations. Additionally, threshold values may be established by a user for flagging a relationship as material based on a pre-determined increase in mentions.

Some embodiments of the present invention are directed to a special evaluation of the knowledge corpus being studied to understand a basis for changes in the mention-frequency counts. If an increase or decrease in mention counts is due to the inclusion, or exclusion, of a particular document this is also considered to be material.

Some embodiments of the present invention output components of the test according to a rank from 0-1. User-defined weights may, in some example, be required to combine to be 100%. Newness, or recentness, ranks high on the list based on the assumption that new relationships in the domain are always material. Count (integer) of mentions from output (the higher the count the higher the rank). Count (integer) of mentions from output against a general body of knowledge, where the higher count results in a higher rank. Evidence sources are matched against a pre-determined ranking of veracity of the sources from an impartial third party rating agency. The more authoritative evidence receives a higher rank. Tracks against a dictionary of original timestamp of when the relationship was first found. Older relationships rank lower. Match against a dictionary of commonly known relationships for a domain. A matched relationship indicates common knowledge and is ranked lower or completely removed from review. The UI accepts concepts, keywords, and/or phrases defined by the user for the algorithm tests against a specific and/or general body of knowledge.

Additional ranking considerations, focused on recentness, support output including: (i) new relationship(s) plus supporting evidence; (ii) original relationship(s), corresponding changed relationship(s), or semantic variant(s) of the original relationship(s), and supporting evidence; and/or (iii) a count for the number of mentions organized by "past" and "present" mentions, and supporting evidence (corpus changes may also be output as-appropriate).

For each result from the relationship discovery, a calculation (1) from the segments 0-6 is performed:

$$\text{Sum(User Defined Weight*Rank Integer)} \quad (1)$$

Results are returned on a scale from 0 - 100 with higher being better. A normalization step is needed to properly score up to 100, which is a perfect score. Users can configure a threshold materiality for removing certain relationships via, for example, a UI.

Some embodiments of the present invention are directed to a method to assign a value to discovered relationships in an information handling system capable of answering questions comprising: ingesting, by a system, a body of information, or corpus, for a domain; receiving, by the system, a question; applying natural language processing (NLP), by the system, to parse the question into an NLP structure comprising a lexical answer type (LAT) and a focus, or target; mining the body of information to identify entities and relationships between the entities based on the focus; and ranking, that is, assigning a value to, relationships according to an importance criteria, or value, comprising weighting for age in the domain, weighting age in an general, usually public, body of knowledge, and weighting for references.

Some embodiments of the present invention are further directed to providing a user interface (UI) that allows a user to adjust the importance criteria with additional detailed weightings comprising concepts, keywords, and phrases; and responsive to the user utilizing the UI, applying the detailed weighting to relationships to adjust the ranking, and displaying the relationships ordered by ranking.

Some embodiments of the present invention are directed to a UI that further comprises: displaying the relationships ordered according to aspects weighted by, for example, the age of the relationship, corpus counts, external counts, evidence source reliability, and user-defined criteria.

Figure 5:
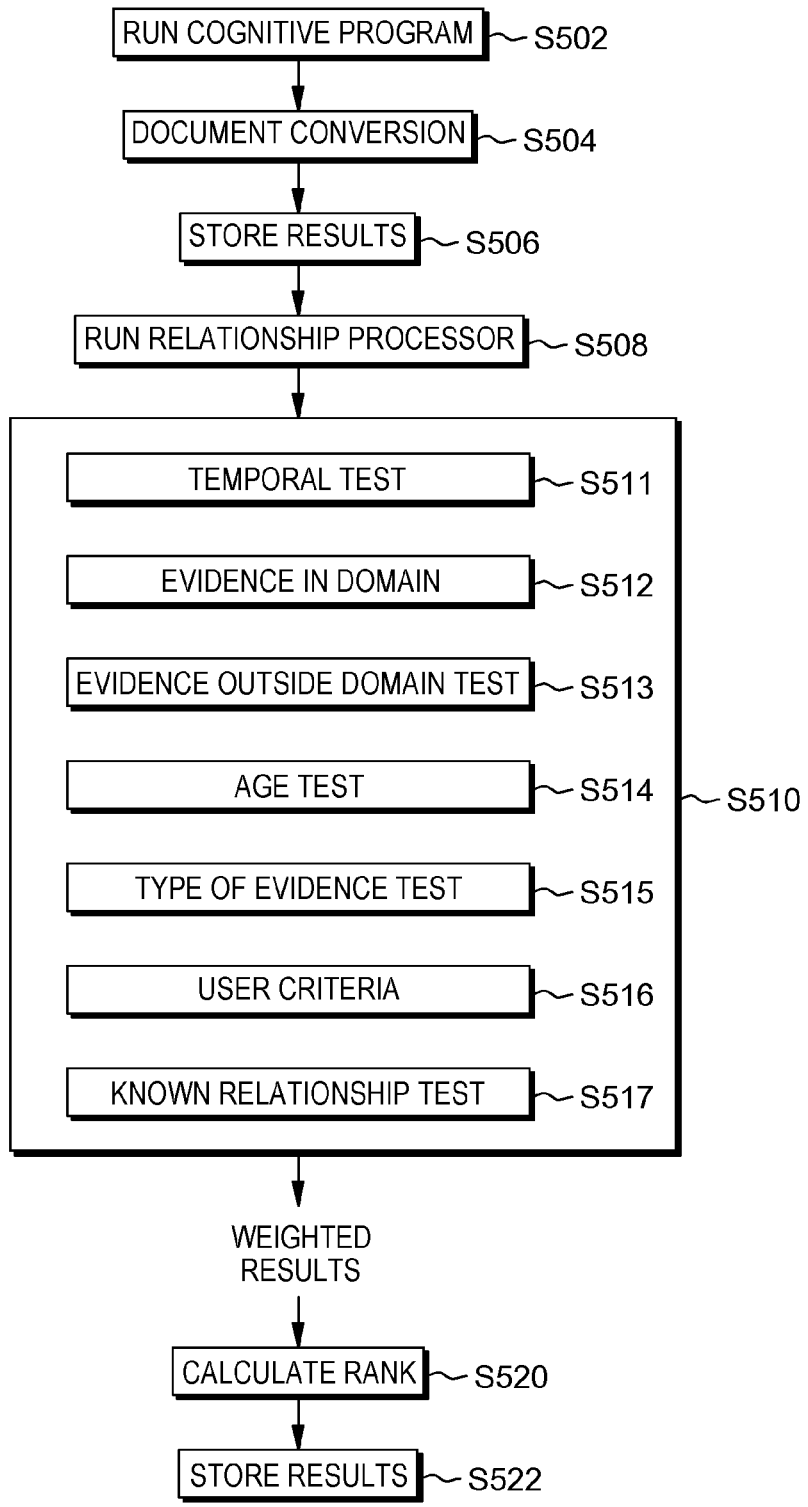
FIG. 5 is a flowchart of a second embodiment of a method according to the present invention.

FIG. 5 shows flowchart 500 depicting a second method according to an embodiment of the present invention. This method, which establishes a run-time results relevancy ranking, will now be discussed, over the course of the following paragraphs.

Processing begins at step S502, where a cognitive program is executed to identify, or discover, relationships based on a query submitted by a user. In this example, the identified relationships are output as an XML document.

Processing proceeds to step S504, where the XML document is converted to a targeting document in a preferred format for processing.

Processing proceeds to step S506, where the targeting document having the identified relationships is stored for relationship analysis.

Processing proceeds to step S508 where a relationship analysis program is initialized for analyzing the targeting document generated in step S504.

Processing proceeds to step S510, where the process of weighting the various aspects of the targeting document with respect to the discovered relationships is implemented. In this example, sub-steps S511-S517 comprise the weighting process.

For each sub-step test, the results are recorded for each discovered relationship. The combined results of the sub-step tests provide an indicator as to the significance of each discovered relationship.

The tests in this example are as follows: temporal test S511; evidence in domain test S512; evidence outside of domain test S513; age test S514; type of evidence test S515; user criteria test S516; and known relationship test S517. In the alternative, only one or fewer than all of the tests are performed to produce "combined" test results, or "weighted results." That is, the test operate to establish a weighting among the various relationships. The weighting being an indication as to the significance, or materiality, of the insight involved in discovering a given relationship.

Temporal test S511 operates to determine the time in which a discovered relationship is first identifiable according to the domain-specific corpus.

Evidence in domain test S512 operates to determine a degree, or relative amount, of evidence available in the domain-specific corpus to support a discovered relationship.

Evidence outside of domain test S513 invokes secondary knowledge bases outside of the focus domain. When such non-domain corpus is available, this test operates to determine a degree, or relative amount, of evidence available in that secondary knowledge base.

Age test S514 operates to determine the duration of time that the discovered relationship was known according to the domain-specific corpus.

Type of evidence test S515 operates to sort the various evidence data points according to a type of evidence. For example, some evidence is generated by a third-party and other evidence is generated by the party of interest, or subject of the data. That is, the source of the evidence is one way to classify a "type" of evidence.

User-criteria test S516 is a user-generated criteria specific to the question at hand. The user-criteria test operates to further refine the ranking discovered relationship analysis according to a custom criteria.

Known relationship test S517 operates to assign a lower ranking to relationships that are determined to be known in the focus domain. In that way, the material insights are higher ranked than those potential material insights that are already known within the focus domain.

Processing proceeds to step S520, where the rank is calculated to establish an order of significance among a set of discovered relationship included in the targeting document.

Processing ends at step S522, where the rankings are stored for later reference.

Figure 6:
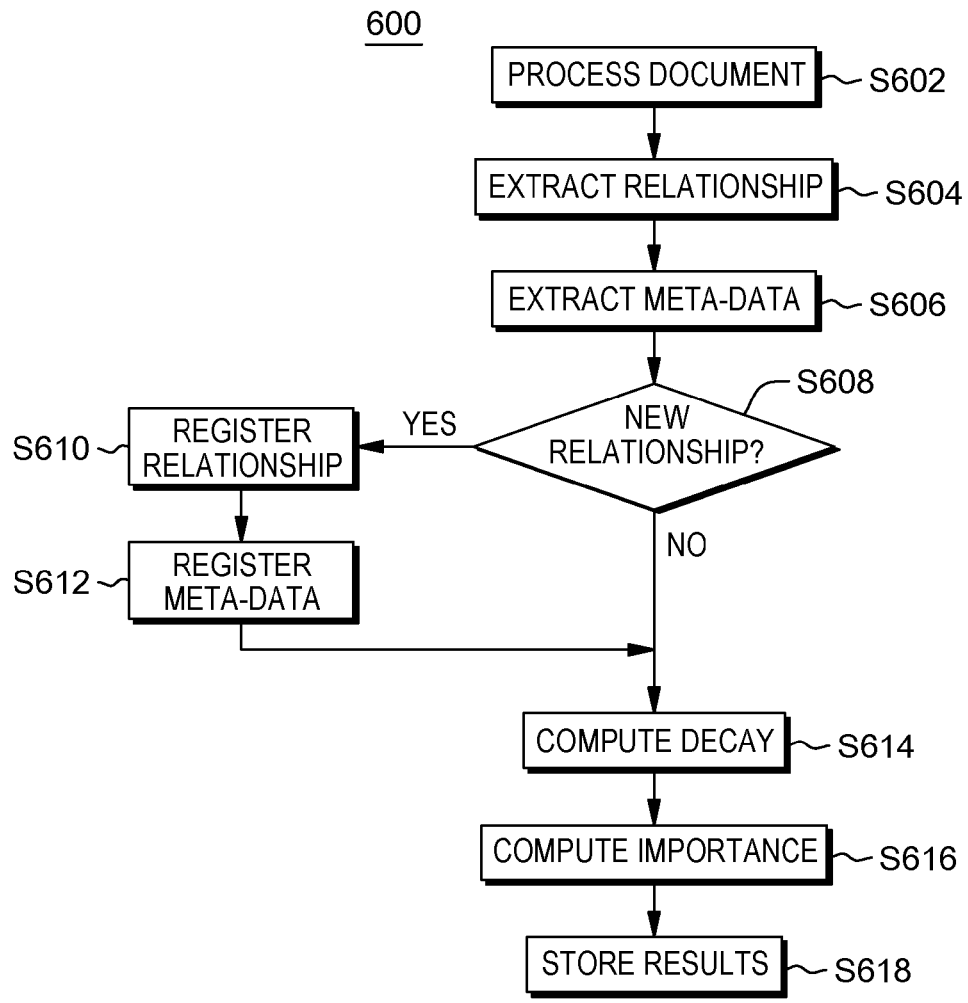
FIG. 6 is a flowchart of a third embodiment of a method according to the present invention.

FIG. 6 shows flowchart 600 for determining relevant relationships based on temporal continuance according to an embodiment of the present invention. This method will now be discussed, over the course of the following paragraphs.

Processing begins at step S602, where a document is processed. In this step, a designated document is processed for relationship data to be included in a corpus of data for a question-answering system. The data is processed in that it is translated and/or formatted as-needed for interpretation and/or analysis.

Processing proceeds to step S604, where relationships among entities as presented within the document are identified and extracted. This activity may also be referred to a discovering relationships within the document.

Processing proceeds to step S606, where meta-data is extracted from the document. The meta-data in the document is associated with the discovered relationships. The meta-data may provide helpful classification of the discovered relationships, including: (i) date of publication; (ii) date of draft; (iii) originator (or owner) of the document; (iv) rating of the author; (v) source of document (government, news service, technical journal); and/or (iv) revision history. Depending on the source and/or other meta-data the accuracy and/or reliability of the information may be weighted. The more often a relationship is detected in reliable, or trusted, source documents, the more accurate and/or reliable the relationship becomes. In some embodiments one source is deemed more-trusted than or sources. A more-trusted source has a higher weight than the weight of an average source, while a less-trusted source has a lower weight than the weight of an average source.

Processing proceeds to decision step S608, where a determination is made for each discovered relationship as to whether the relationship is new to the database, or store, where earlier discovered relationships associated with the particular domain are recorded, or registered (in this example). If a discovered relationship is new, then processing follows the "Yes" branch to step S610. If a discovered relationship is not new, processing follows the "No" branch to step S614. In this example, where no new relationship is found among any of the discovered relationships, processing follows the "No" branch. For a set of new relationships, processing follows the "Yes" branch, where the relationship data is registered. This example describes batch processing of the discovered relationships. Alternatively, for each discovered relationship, it is determined whether or not it is a new relationship. Processing proceeds through the following steps, returning to S608 until all discovered relationships are addressed.

For a new relationship, processing proceeds to step S610, where the new relationship is registered. In this example, registration includes storing the relationship in a relationship store, such as relationship store 305 (FIG. 1) in the form of a triple. Alternative storage schemes may apply, so long as the relationship is recorded for later reference.

Processing proceeds to step S612, where the meta-data extracted in step S606 is registered. In this example, relationships and their corresponding meta-data are associated together in a relationship store for later reference. Alternatively, a separate meta-data store records meta-data registration. As stated earlier, the associated meta-data provides insight into temporal continuance of the discovered relationship.

Processing proceeds, whether from step S608 or from step S612, to step S614, where decay of the discovered relationship(s) is computed. In order to establish temporal continuance, recentness, and/or degree of alignment, the relative decay of discovered relationships provides timeliness data for ranking a set of relationships according to one or more of those metrics.

Processing proceeds to step S616, where an importance level is computed for the discovered relationship(s). An importance level for a given relationship depends largely on the metric used for comparing relationships. Importance factors include temporal continuance, recentness, and/or degree of alignment. Some embodiments of the present invention recognize that a discovered relationship that is recent may be more "important" than one that has been known for a long time. Further, a discovered relationship that is strongly aligned with general knowledge in a particular domain is likely less important than one that is less aligned with such knowledge.

Processing ends at step S618, where the results of decay and importance computations are stored. In this example, the discovered relationship, corresponding meta-data, and calculated markers such as decay and importance are each stored in a relationship store for on-demand access and analysis, for example, during a question-answer session by a cognitive computing system.

Figure 7:
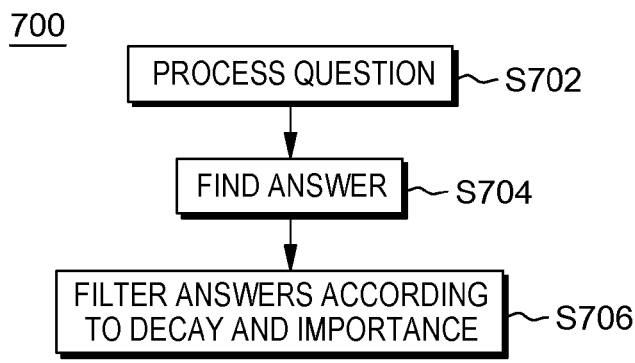
FIG. 7 is a flowchart of a fourth embodiment of a method according to the present invention.

FIG. 7 shows flowchart 700 for determining answers to a question ranked according to temporal continuance. This method will now be discussed, over the course of the following paragraphs.

Processing begins at step S702, where a natural language question is processed. In this example, a user inputs a natural language question into a question-answering system. The question is processed according to conventional methods where the question is parsed for characteristic elements such as lexical answer type (LAT) and question focus.

Processing proceeds to step S704, where the question-answering system determines a set of appropriate answers to the question processed in step S702.

Processing proceeds to step S706, where the set of answers determined in step S704 are filtered according to the computed decay and/or importance of corresponding relationships supporting one or more of the various answers.

By filtering the set of answers, the answer(s) provided are more likely to provide insightful and more helpful information. In some embodiments of the present invention, the filtering process yields a single highly relevant and insightful answer to the question processed in step S702.

Some embodiments of the present invention may include one, or more, of the following features, characteristics and/or advantages: (i) applies to many types of cognitive discovery process, including those used in financial services, healthcare, and culinary arts; (ii) makes a determination as to the significance of discovered relationships; (iii) assists human analysts to process discovered relationships to increase the speed of identification of material relationships worth even closer analysis; (iv) precise targeting of relevant results; (v) applies a targeting algorithm that allows for a substantial reduction in research time; (vi) reduces the noise of the output; (vii) reduces potential distraction and/or fatigue of the human analyst; (viii) increased user confidence in provided results; (ix) makes a determination as to the materialness of relationships from the user's perspective; (x) makes a determination as to the materialness of relationships or from a pre-determined criteria; (xi) makes a determination as to the materialness decay of relationships from a user's perspective; and/or (xii) makes a determination as to the materialness decay of relationships from per-determined criteria.

Some helpful definitions follow:

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein that are believed as maybe being new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

User/subscriber: includes, but is not necessarily limited to, the following: (i) a single individual human; (ii) an artificial intelligence entity with sufficient intelligence to act as a user or subscriber; and/or (iii) a group of related users or subscribers.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

Natural Language: any language used by human beings to communicate with each other.

Natural Language Processing: any derivation of meaning from natural language performed by a computer.

Annotate: to add information to text, including, but not limited to: (i) adding additional textual content, such as by linking, tagging (and part-of-speech tagging), adding metadata, providing markup, indicating lemma (or base forms of a word), labeling, commenting, or explaining; and/or (ii) modifying the text, such as by highlighting, underlining, bolding, italicizing, or parsing.

What is claimed is:

1. A computer program product comprising a computer-readable storage medium having a set of instructions stored therein which, when executed by a processor, causes the processor to determine a significance ranking for discovered relationships by:
ingesting a first body of information for a domain of knowledge;
receiving a natural language question corresponding to the domain of knowledge, the natural language question being in the form of a complete human language question;
parsing the natural language question to identify a focus within the text of the natural language question;
mining the body of information for found entities disclosed within the body of information;
determining relationships among found entities based on the focus identified within the text of the natural language question;
generating a targeting document for the domain of knowledge containing a first relationship and a second relationship, the first and second relationships being relationships among found entities determined from the first body of information;
recording mining data for relationships in the targeting document in support of an importance criteria;
ranking the first relationship with respect to the second relationship based on the recorded mining data and according to the importance criteria as a set of ranking data; and
storing the targeting document including the set of ranking data and mining data in the first body of information for on-demand access during a question-answer session corresponding to the domain of knowledge;
wherein:
the importance criteria is a first degree to which first relationship is known and a second degree to which the second relationship is known according to a dictionary of commonly known relationships for the domain of knowledge;
the first relationship being ranked as more important than the second relationship because the first degree is smaller than the second degree.

2. The computer program product of claim 1, wherein the importance criteria is further based upon an age of the first relationship compared to an age of the second relationship.

3. The computer program product of claim 1, wherein the importance criteria further relates to a comparison of a number of evidentiary documents within the first set of evidence and a number of evidentiary documents within the second set of evidence.

4. The computer program product of claim 3, wherein the comparison relates to a first count of evidentiary documents within the first set of evidence and a second count of evidentiary documents within the second set of evidence, the first and second counts representing the number of evidentiary documents available outside of the domain of knowledge.

5. The computer program product of claim 1, further comprising:
registering the corresponding set of relationships in a relationship store having a set of relationships identified from the first body of information.

6. The computer program product of claim 1, further comprising:
reporting to a user a set of top-ranked relationships in the targeting document.

7. The computer program product of claim 1, further comprising:
classifying an identified relationship as a less-trusted fact; and
modifying the classification of the identified relationship from the less-trusted fact to a more-trusted fact based at least in part upon a count of trusted sources that support the identified relationship.

8. The computer program product of claim 1, further comprising:
reporting the set of ranking data as input to determine a restated question.

9. The computer program product of claim 1, wherein the natural language question is presented as a training question corresponding to a new document to be added to the first body of information.

10. The computer program product of claim 9, further comprising:
incorporating the new document into the first body of information to form a second body of information.

11. A computer system comprising:
a processor set; and
a computer readable storage medium;
wherein:
the processor set is structured, located, connected, and/or programmed to run program instructions stored on the computer readable storage medium; and
the program instructions which, when executed by the processor set, cause the processor set to determine a significance ranking for discovered relationships by:
ingesting a first body of information for a domain of knowledge;
receiving a natural language question corresponding to the domain of knowledge, the natural language question being in the form of a complete human language question;
parsing the natural language question to identify a focus within the text of the natural language question;
mining the body of information for found entities disclosed within the body of information;
determining relationships among found entities based on the focus identified within the text of the natural language question;
generating a targeting document for the domain of knowledge containing a first relationship and a second relationship, the first and second relationships being relationships among found entities determined from the first body of information;
recording mining data for relationships in the targeting document in support of an importance criteria;
ranking the first relationship with respect to the second relationship based on the recorded mining data and according to the importance criteria as a set of ranking data; and
storing the targeting document including the set of ranking data and mining data in the first body of information for on-demand access during a question-answer session corresponding to the domain of knowledge;
wherein:
the importance criteria is a first degree to which first relationship is known and a second degree to which the second relationship is known according to a dictionary of commonly known relationships for the domain of knowledge;
the first relationship being ranked as more important than the second relationship because the first degree is smaller than the second degree.

12. The computer system of claim 11, wherein the importance criteria is further based upon an age of the first relationship compared to an age of the second relationship.

13. The computer system of claim 11, further comprising:
registering the corresponding set of relationships in a relationship store having a set of relationships identified from the first body of information.

14. The computer system of claim 11, further comprising:
classifying an identified relationship as a less-trusted fact; and
modifying the classification of the identified relationship from the less-trusted fact to a more- trusted fact based at least in part upon a count of trusted sources that support the identified relationship.

15. The computer system of claim 11, wherein the importance criteria further relates to a comparison of a number of evidentiary documents within the first set of evidence and a number of evidentiary documents within the second set of evidence.

16. The computer system of claim 11, further comprising:
reporting to a user a set of top-ranked relationships in the targeting document.

17. The computer system of claim 11, further comprising:
reporting the set of ranking data as input to determine a restated question.

18. The computer system of claim 11, wherein the natural language question is presented as a training question corresponding to a new document to be added to the first body of information.

19. The computer system of claim 18, further comprising:
incorporating the new document into the first body of information to form a second body of information.

* * * * *